US010025722B2

(12) United States Patent
Aslot et al.

(10) Patent No.: US 10,025,722 B2
(45) Date of Patent: *Jul. 17, 2018

(54) EFFICIENT TRANSLATION RELOADS FOR PAGE FAULTS WITH HOST ACCELERATOR DIRECTLY ACCESSING PROCESS ADDRESS SPACE WITHOUT SETTING UP DMA WITH DRIVER AND KERNEL BY PROCESS INHERITING HARDWARE CONTEXT FROM THE HOST ACCELERATOR

(71) Applicant: International Business Machines Corporation, Armonk, NY (US)

(72) Inventors: Vishal C. Aslot, Austin, TX (US); Arnold Flores, Round Rock, TX (US); Mark D. Rogers, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/925,646

(22) Filed: Oct. 28, 2015

(65) Prior Publication Data

US 2017/0123999 A1     May 4, 2017

(51) Int. Cl.
*G06F 12/10*     (2016.01)
*G06F 12/12*     (2016.01)
(Continued)

(52) U.S. Cl.
CPC .......... *G06F 12/1009* (2013.01); *G06F 12/10* (2013.01); *G06F 12/126* (2013.01);
(Continued)

(58) Field of Classification Search
CPC ................................................. G06F 2212/151
See application file for complete search history.

(56) References Cited

U.S. PATENT DOCUMENTS 5,724,538 A * 3/1998 Morris ................ G06F 12/1018
711/206
8,015,388 B1 * 9/2011 Rihan ................ G06F 12/1045
711/203

(Continued)

OTHER PUBLICATIONS

Article [online]. National Instruments, Apr. 16, 2012 [retrieved on Jun. 6, 2017]. Retrieved from the Internet <http://www.ni.com/white-paper/6984/en/>.*

(Continued)

*Primary Examiner* — Ann J Lo
*Assistant Examiner* — Chie Yew
(74) *Attorney, Agent, or Firm* — Patterson + Sheridan, LLP

(57) ABSTRACT

Systems and computer program products to perform an operation comprising identifying, in a software page frame table by an operating system interrupt handler, a physical address of a memory page, wherein the physical address of the memory page is identified based on a virtual segment identifier (VSID) and a page number, wherein the VSID is specified in an interrupt received from a coherent accelerator and wherein the coherent accelerator generated the interrupt in response to a page fault associated with the memory page, and creating, by the operating system interrupt handler, a page table entry in a hardware page table associating the VSID and the page number with the physical address of the memory page, wherein creating the page table entry resolves the page fault.

12 Claims, 9 Drawing Sheets

(51) Int. Cl.
*G06F 12/1009* (2016.01)
*G06F 12/126* (2016.01)
*G06F 12/1027* (2016.01)

(52) U.S. Cl.
CPC .. *G06F 12/1027* (2013.01); *G06F 2212/1024* (2013.01); *G06F 2212/657* (2013.01)

(56) References Cited

U.S. PATENT DOCUMENTS

| | | | |
|---|---|---|---|
| 2005/0071840 A1* | 3/2005 | Neiger | G06F 9/45533 718/1 |
| 2006/0161760 A1 | 7/2006 | Jordan et al. | |
| 2006/0259734 A1* | 11/2006 | Sheu | G06F 12/1036 711/203 |
| 2007/0299990 A1* | 12/2007 | Ben-Yehuda | G06F 12/1081 710/22 |
| 2009/0150641 A1* | 6/2009 | Flynn | G06F 3/061 711/202 |
| 2009/0198918 A1* | 8/2009 | Arimilli | G06F 12/109 711/153 |
| 2010/0125709 A1* | 5/2010 | Hall | G06F 12/1036 711/154 |
| 2010/0332727 A1* | 12/2010 | Kapil | G06F 12/08 711/103 |
| 2011/0072234 A1 | 3/2011 | Chinya et al. | |
| 2011/0161619 A1* | 6/2011 | Kaminski | G06F 9/5016 711/207 |
| 2012/0047348 A1* | 2/2012 | Devine | G06F 12/1009 711/206 |
| 2014/0201465 A1 | 7/2014 | Blaner et al. | |
| 2014/0236561 A1 | 8/2014 | Dusanapudi et al. | |

OTHER PUBLICATIONS

IBM "List of IBM Patents or Patent Applications Treated as Related".

U.S. Appl. No. 14/987,537, entitled Efficient Translation Reloads for Page Faults, dated Jan. 4, 2016.

Anonymously, "Method for Handling Page Boundary Crossings Encoundered by a Hardware Accelerator", An IP.com Prior Art Database Technical Disclosure, Sep. 24, 2010, 6 pages. <http://ip.com/IPCOM/000200051>.

IPCOM, "Address Translation Using Variable-Sized Page Tables", An IP.com Prior Art Database Technical Disclosure, Aug. 4, 2003, 7 pages. <http://ip.com/IPCOM/000018736>.

* cited by examiner

| ESID 405 | PAGE NUMBER (PNO) 410 | BYTE OFFSET 415 |
|---|---|---|

EFFICIENT TRANSLATION RELOADS FOR PAGE FAULTS WITH HOST ACCELERATOR DIRECTLY ACCESSING PROCESS ADDRESS SPACE WITHOUT SETTING UP DMA WITH DRIVER AND KERNEL BY PROCESS INHERITING HARDWARE CONTEXT FROM THE HOST ACCELERATOR

BACKGROUND

Embodiments presented herein generally relate to FPGA-based coherent accelerators, and more specifically, to efficient translation reloads for page faults occurring on computing systems with FPGA-based coherent accelerators.

Some FPGA-based hardware accelerators provide an application direct access to the hardware accelerator. For example, an FPGA-based coherent accelerator allows an application to execute SCSI commands in an application's memory (i.e., user space) directly. In contrast to conventional hardware accelerators that need physical addresses to execute bus commands, coherent accelerators use effective addresses to issue bus commands to an attached storage device. As a result, an operating system does not need setup actions that are typical (and computationally expensive) to a conventional hardware accelerator, such as translating effective addresses to physical addresses, which requires steps such as pinning memory pages to ensure the physical pages are not deleted and reassigned to another virtual address. A coherent accelerator translates effective addresses to real addresses while accelerating a function. Therefore, the operating system, via the coherent accelerator, allows page faults to occur, handling the page faults such that the accelerator may continue to access application memory. This approach greatly reduces the number of instructions required to set up a DMA path for data transfer. Further, coherent accelerators allow developers to customize applications to more efficiently use the FPGA.

To access the coherent accelerator, an application attaches application memory to a hardware context of the coherent accelerator. A hardware context may include a page table that maps application memory to physical pages. Further, a hardware context may include a segment table for processors that have a segmented architecture, which specify which virtual pages belong to a given segment.

Coherent accelerators typically cannot create page translation entries. So if a page translation entry for a requested address is not found, the coherent accelerator must have the operating system create one by sending an external interrupt to one of the system's processors. On conventional systems, page faults generate synchronous exceptions which arrive in the context of a process as a result of a memory access instruction (e.g., loads, stores, etc.). Therefore, the interrupts generated on such systems responsive to page faults are synchronous interrupts. However, coherent accelerators may generate asynchronous interrupts, as the system processor may receive an interrupt from the coherent accelerator related to a process that is not currently executing on that processor.

Furthermore, the page fault interrupt handling environment is a very restrictive context that has limited access to system memory, and no access to the data structures of the process causing the page fault to determine whether the physical address is still valid. Further complicating matters is the potential address space shrinkage being performed in parallel on other CPUs (i.e., by the owning process that created the page fault) that may invalidate the translation the coherent accelerator is requesting.

SUMMARY

Embodiments disclosed herein include systems and computer program products to perform an operation comprising identifying, in a software page frame table by an operating system interrupt handler, a physical address of a memory page, wherein the physical address of the memory page is identified based on a virtual segment identifier (VSID) and a page number, wherein the VSID is specified in an interrupt received from a coherent accelerator and wherein the coherent accelerator generated the interrupt in response to a page fault associated with the memory page, and creating, by the operating system interrupt handler, a page table entry in a hardware page table associating the VSID and the page number with the physical address of the memory page, wherein creating the page table entry resolves the page fault.

BRIEF DESCRIPTION OF THE SEVERAL VIEWS OF THE DRAWINGS

FIG. 4 illustrates an example layout of an effective address, according to one embodiment.

DETAILED DESCRIPTION

Figure 1:
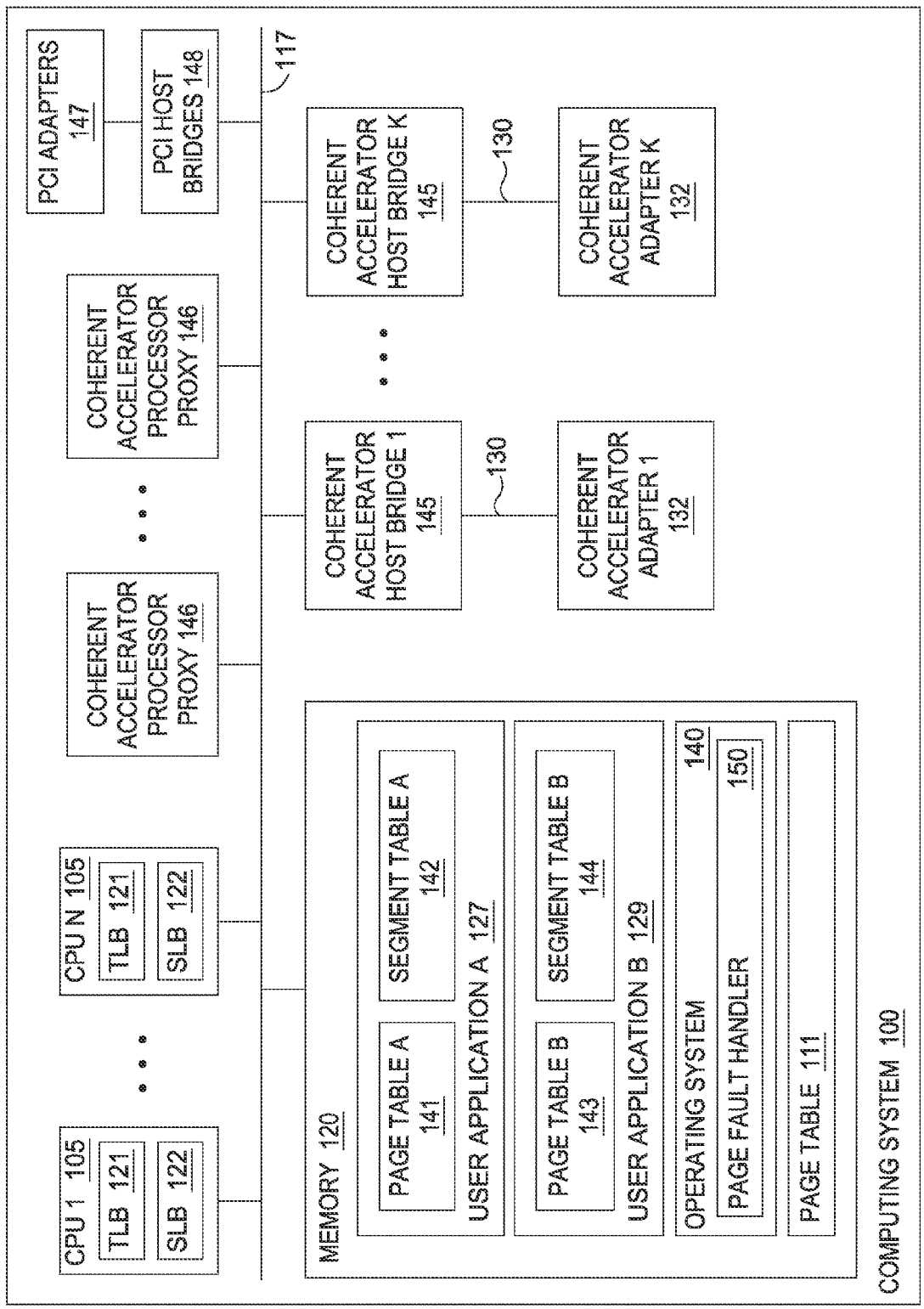
FIG. 1 illustrates an example computing system configured with a coherent accelerator, according to one embodiment.

Embodiments disclosed herein provide techniques to efficiently resolve page faults incurred by a coherent accelerator by an operating system interrupt handler with minimal serialization with the owning process (whose address space caused the page fault) and without needing to switch to the owning process' context (and executing the process on a processor). Generally, embodiments disclosed herein leverage a low-level global kernel data structure (referred to herein as a software page frame table, or "SWPFT") used to optimize the process of searching for the physical page of a virtual segment identifier (VSID) and virtual page number (PNO). If the interrupt handler finds an entry in the SWPFT that matches the faulting VSID/PNO combination and the underlying page state of the page in that entry does not prevent new translations, embodiments disclosed herein may create a corresponding page translation entry to resolve the page fault. The page translation entry that is created is guaranteed to be valid even if the VSID no longer belongs to the address space that the coherent accelerator is accessing. If the SWPFT does not include a match for the VSID/

PNO combination, or the page state does not currently allow translations, the interrupt handler may transfer the request to the process to handle using a slower method (e.g., via the operating system kernel).

The SWPFT has the property that adding, removing, and searching entries in the SWPFT requires taking a lock, which is used by embodiments disclosed herein to provide serialized translations. Pages in the SWPFT have state information which specify whether a translation for that page can be created or not (e.g., pages in an I/O state generally allow new general use translations). Page state translations follow a protocol that includes changing the state, then removing any existing translations. The lock, state, and translations protocol ensure that the coherent accelerator page fault handler can correctly determine whether it can or cannot create a new translation for that page from the interrupt level. Doing so ensures that a bad translation will never be created and that access to a virtual page will not be incorrectly granted.

When the page translation entry is created, the page fault should be resolved. After the page fault completes, the coherent accelerator may retry the memory reference. The coherent accelerator may find that the translation created is valid and proceed with its operations. The coherent accelerator may further determine that the segment is no longer in the segment table and generate a segment fault, or that the translation is not correct and generate a new page fault, or that the page is now invalid and abort the operation.

A page fault occurs when a running program accesses a memory page that is mapped into the virtual address space, but the data is not present in main memory. Some systems may provide a coherent accelerator processor interface (CAPI) which allows a coherent accelerator to directly access the memory of a requesting process using the requesting process' effective address space. The coherent accelerator may use a segment table allocated to the requesting process to map the effective address to a global virtual segment identifier (VSID) and a page number (VPN). The coherent accelerator may then search a hardware page table (HPT), which is global to all processes in the system, for a page translation entry (PTE) that matches the VSID and VPN. If found, the PTE includes the physical address needed for CAPI to access the memory. If no such PTE is in the HPT, a page fault occurs.

Note, the following describes a coherent accelerator processor interface (CAPI) as a reference example of a FPGA-based coherent accelerator. However, one of skill in the art will recognize that the embodiments disclosed herein may be adapted to a variety of coherent accelerators.

FIG. 1 illustrates an example computing system 100 configured with an FPGA-based coherent accelerator, according to one embodiment. As shown, computing system 100 includes one or more central processing units (CPUs) 1-N 105, one or more coherent accelerator processor proxies (CAPPs) 146, one or more peripheral component interconnect (PCI) adapters 147, one or more PCI host bridges 148, a memory 120, one or more coherent accelerator host bridges 1-K 145, and one or more coherent accelerator adapters 1-K 132. The CPUs 105, CAPPs 146, PCI host bridges 148, memory 120, and coherent accelerator host bridges 145 may each be connected via an interconnect bus 117. Further, the coherent accelerator adapters 132 may each connect with a respective coherent accelerator host bridge 145. The computing system may also include an I/O device interface connecting I/O devices (e.g., keyboard, display, and mouse devices) to the computing system 100. Storage devices may be connected via one of the coherent accelerator adapters 132 or PCI adapters 147. The CPUs 105 each include a translation lookaside buffer (TLB) 121 and a segment lookaside buffer (SLB) 122. The hardware page table 111 stores system-wide mappings between virtual addresses and physical addresses. In one embodiment, the virtual addresses in the hardware page table 111 are based on a hash of a virtual segment identifier (VSID) and virtual page number (PNO).

Each CPU 105 retrieves and executes programming instructions stored in the memory 120 as well as stores and retrieves application data residing in the storage devices. The bus 117 is used to transmit programming instructions and application data between the CPUs 105, CAPPs 146, PCI host bridges 148, coherent accelerator host bridges 145, and memory 120. In one embodiment, CPU 105 is representative of the "POWER" microprocessor by IBM.

In one embodiment, the coherent accelerator adapter 132 is a FPGA-based hardware accelerator that may directly access an effective address space of an application (e.g., the user application A 127, user application B 129, etc.). Each application has its own effective address space. For example, a 32-bit process may have an effective address space from $2^0$ to $2^{32}$. Further, each address space comprises a number of fixed-size virtual memory segments. A segment is logical container of pages and, in this embodiment, is fixed-sized at 256 MB. A page is a fixed-size piece of memory. The 32-bit effective address space described in this example may contain up to sixteen segments. As another example, a 64-bit effective address space may contain up to $2^{36}$ segments. Further still, each effective address in a process effective address space includes an effective segment identifier (ESID), which specifies a segment for that effective address.

Figure 9:
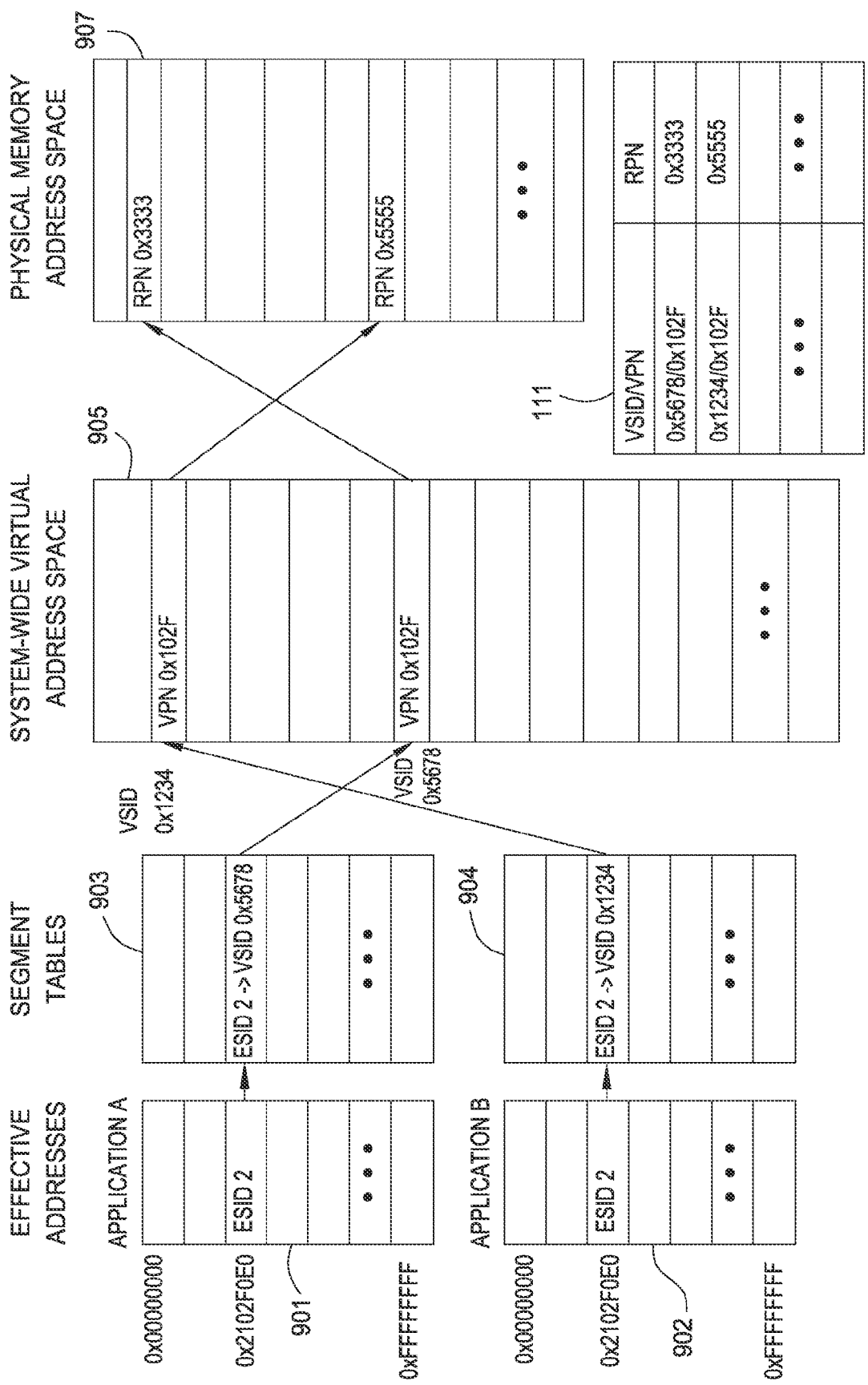
FIG. 9 illustrates an example set of address spaces, according to one embodiment.

In some systems, effective addresses in a user application address space do not map directly to real memory. In one embodiment, an operating system 140 of computing system 100 maintains a global virtual address space that maps to real memory. Further, the global virtual address space comprises a number of segments, where each virtual address includes a virtual segment identifier (VSID) that specifies a segment for that virtual address. In addition, each effective address maps into a location in the global virtual address space. An example of such address spaces is depicted in FIG. 9, described in greater detail below.

The coherent accelerator adapter 132 provides a general purpose framework for transferring data to and from application memory, without requiring a direct memory access (DMA) setup. As a result, the coherent accelerator adapter 132 significantly reduces the I/O path length (e.g., from tens of thousands of instructions to a few hundred instructions). Further, the coherent accelerator adapter 132 allows developers to customize on the FPGA without having to create additional software to do so. For instance, user application A 127 is an example of a process that is configured to issue commands to the coherent accelerator adapter 132. Other applications that are not configured to issue commands to the coherent accelerator adapter 132 (e.g., user application B) may still execute within the framework provided by the coherent accelerator adapter 132. As further described below, the coherent accelerator adapter 132 provides data transfer between storage devices and applications via a virtual address space. In one embodiment, the coherent accelerator adapter 132 includes a processor service layer (not shown) that translates virtual addresses to real addresses to provide coherence. Further, processor service layer generates page faults and Accelerator Function Unit (AFU)-specific interrupts.

In one embodiment, the user application A 127 includes a page table A 141 and a segment table A 142. In addition, the user application B 129 includes a page table B 143 and a segment table B 144. The page tables 141 and 143 are per-process (or per-application) page tables, and map virtual pages to corresponding physical addresses in memory 120. In at least one embodiment, the page tables 141 and 143 are subsets of the global hardware page table 111. The segment tables 142 and 144 stores mappings of effective addresses to virtual addresses for their respective applications. In one embodiment, the TLB 121 and the SLB 122 of the CPU 105 are lookaside buffers used by the coherent accelerator adapter 132 to maintain recent translations of memory addresses. For instance, the SLB 122 may maintain recent translations of effective addresses to virtual addresses. In addition, the TLB 121 may maintain recent translations of virtual addresses to real addresses. In one embodiment, the hardware page table 111, per-process page tables 141 and 143, per-process segment tables 142 and 144, TLB 121, and SLB 122 may be included in a memory management unit (MMU). In one embodiment, the CAPPs 146 enforce coherence in the processor service layers of each coherent accelerator adapter 132. To do so, the CAPPs 146 may monitor coherency traffic (e.g., relating to cache coherence, page table coherence, segment table coherence, etc) on the bus 117.

As shown, the system 100 is under control of an operating system 140. Examples of operating systems include versions of the UNIX operating system (such as the AIX operating system), versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. As shown, the operating system 140 includes a page fault handler 150 which attempts to resolve page faults experienced by processes executed on the CPU 105. When the CPU 105 tries to access a location from a page that is not present in memory, the MMU may interrupt the CPU 105, which halts the process on the CPU 105. The MMU may then invoke the page fault handler 150, which receives the state information of the faulting process. The page fault handler 150 may then perform any number of operations to handle the page fault. For example, the page fault handler 150 may find where the desired page resides (e.g. on a storage device 131), and read the page into memory 120, or create the appropriate entry in the page table 111. If the page fault handler 150 is unable to resolve the page fault and make the requested page available in memory, the offending process must be aborted.

Figure 2:
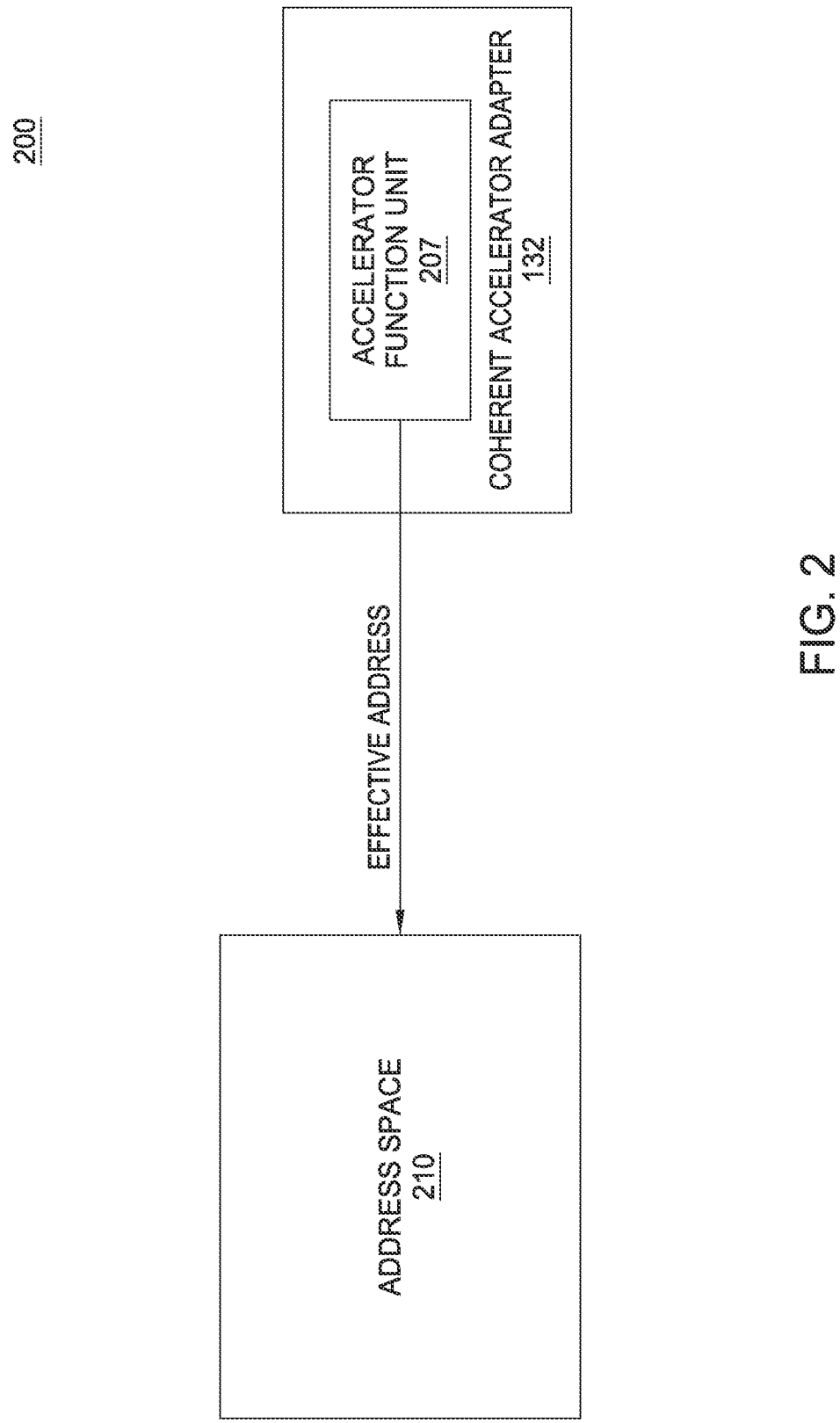
FIG. 2 illustrates an abstraction of data transfer between a process and a coherent accelerator-enabled device, according to one embodiment.

FIG. 2 illustrates an abstraction of data transfer between a coherent accelerator-enabled device (e.g., a storage device) and a process, according to one embodiment. Illustratively, a coherent accelerator adapter 132 allows transfer of data between a storage device and an effective address space 210 of a given application via an accelerator function unit (AFU) 207. The application and the AFU 207 may transfer data to one another using effective addresses.

Each effective address maps to a real address in physical memory. However, because each application using the shared kernel context maintains its own distinct effective address space, rather than directly translate a given effective address to a real address, a kernel device driver executing in the operating system may remap the application-specific effective address to a location in an effective address space global to the other applications using the shared kernel context. The global address space is a virtual mapping of process-specific effective addresses to a shared space. As further described below, the coherent accelerator adapter 132 may then use the remapped effective address to determine a mapping to a real address via a global segment table of the kernel. The global segment table maps effective segment identifiers to a segment identifier of a virtual address.

Figure 3:
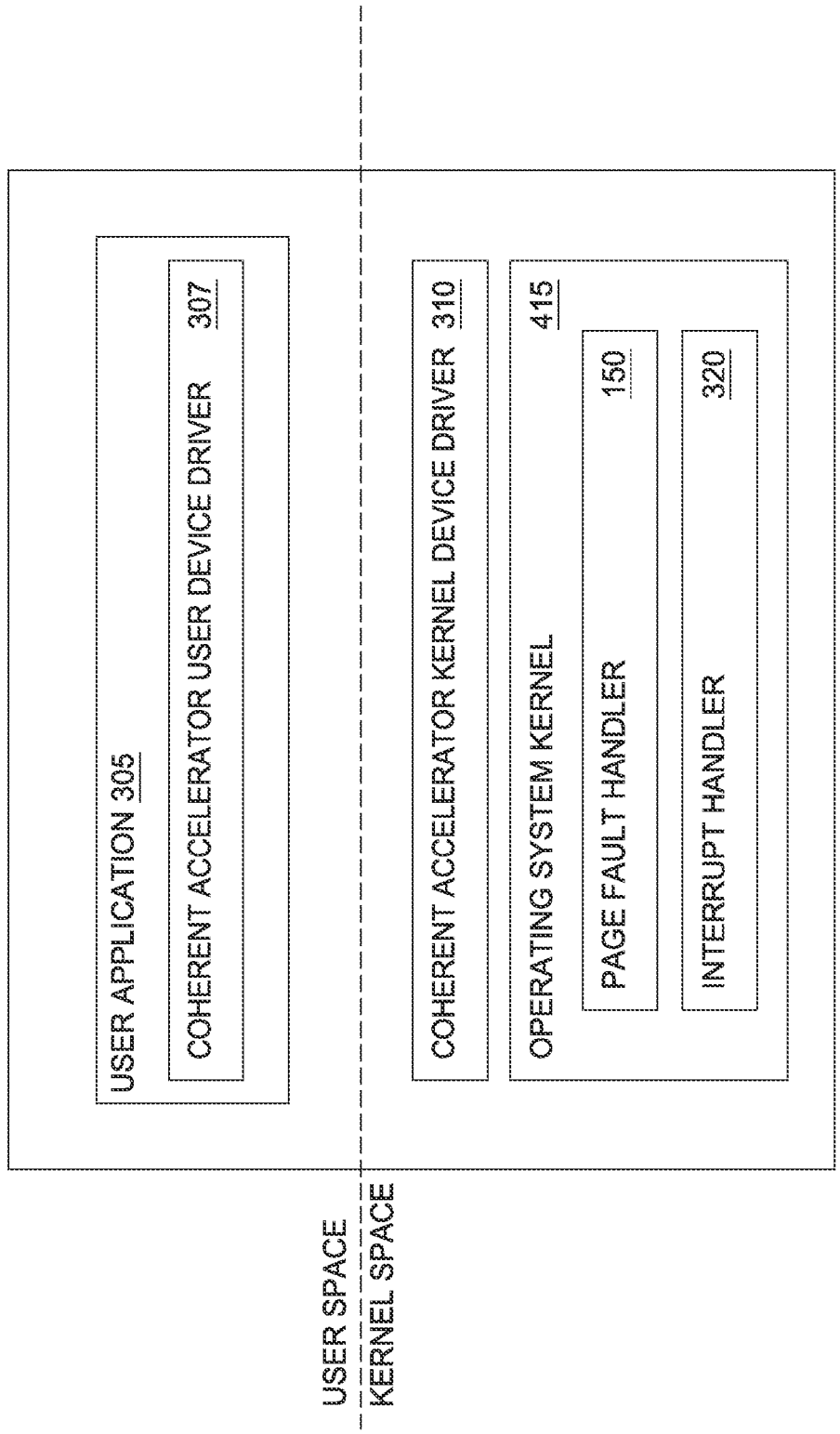
FIG. 3 illustrates an abstraction of a user application configured to communicate with a coherent accelerator, according to one embodiment.

FIG. 3 illustrates a user application 305 configured to communicate with a coherent accelerator, according to one embodiment. Illustratively, FIG. 3 depicts the user application 305 in user space of the operating system of the computer system 100. Further, FIG. 3 depicts a coherent accelerator kernel device driver 310 and an operating system kernel 315 in kernel space of the operating system. The operating system kernel 315 manages memory, tasks, processes, and disks in the operating system. As shown, the operating system kernel 315 includes the page fault handler 150, an interrupt handler 320, and a software page frame table 325. The interrupt handler 320 is generally configured to process interrupts received from the hardware of the system 100, such as the coherent accelerator 132. Examples of interrupts include interrupts generated when a page fault is incurred. The software page frame table (SWPFT) 325 is a structure used by the operating system kernel 315 (and/or the operating system 140) to optimize the searching of a memory page associated with a given VSID/PNO combination. The SWPFT 325 is exhaustive in that each association between a VSID/PNO and the physical address of a memory page in the system 100 is stored in the SWPFT 325 (unlike the hardware page table 111, which is not exhaustive). A lock is required for any process that wishes to access the SWPFT 325.

In one embodiment, the user application 305 includes a coherent accelerator user device driver 307. The device driver 307 is a full user-mode driver that enables the user application 305 to communicate with the coherent accelerator adapter 132. Further, the device driver 307 sends I/O operations and commands to the kernel device driver 310. The user application 305 may use its own context to communicate with the coherent accelerator adapter 132 directly without going through the kernel context.

In one embodiment, the coherent accelerator kernel device driver 310 controls the accelerator function unit of the coherent accelerator adapter 132. For example, the kernel device driver 310 may attach and detach contexts to the coherent accelerator adapter 132 on behalf of application memory. Further, the kernel device driver 310 may perform memory-mapped I/O (MMIO) to the coherent accelerator adapter 132. In addition, the kernel device driver 310 may register a kernel context in a storage device. Doing so allows a given process to use DMA services, e.g., to map/unmap requests in the global segment table in the kernel context.

Generally, the coherent accelerator 132 utilizes hardware contexts that provide resources to an application (or the kernel). The resources include, without limitation, a private segment table that gives the context access to an application's address space directly (the "coherent" property of the coherent accelerator 132), a number of interrupt sources (for page faults, errors, and the like), a command/response queue (e.g., a description of desired operations, such as encryption or decryption of a specified portion of memory), and a memory mapped I/O range. An application (or the kernel) attaching to a hardware context inherits these resources. Doing so allows an application to control the coherent accelerator 132 (e.g., issue commands), and allows the coherent accelerator 132 to read and/or write data directly from the application's address space without having to go through the device driver or kernel to set up DMA.

The contexts may be viewed as a run-queue, where the coherent accelerator 132 executes commands (or instructions) associated with each context. Generally, the coherent accelerator 132 executes commands for a single context at any given time. The coherent accelerator 132 may move through the run-queue of contexts using any number of switching methods. For example, the coherent accelerator 132 may perform "round robin" among the contexts, where each context runs for a specified amount of time (like the 10 ms context switch in UNIX). Further still, the coherent accelerator 132 may switch to a different context when a current context encounters a page fault, or when data for a context becomes available. Regardless of the specific method used to switch between contexts, by switching between contexts, the coherent accelerator 132 provides quality of service (QoS) for all applications exploiting the coherent accelerator 132.

FIG. 4 illustrates an example layout of an effective address 400, according to one embodiment. As shown, the effective address 400 includes an effective segment identifier (ESID) 405, a page number (PNO) 410, and a byte offset 415. The ESID 405 specifies a segment in a process' effective address space that the effective address 400 belongs to. A given segment may include a range of addresses. For example, in a 32-bit effective address space, an ESID 405 of 0x0 may include a range of addresses 0x0000_0000 to 0x0FFF_FFFF, an ESID 405 of 0x1 may include a range of addresses 0x1000_0000 to 0x1FFF_FFFF, and so on.

Further, the PNO 410 specifies an index of a page within that segment. The byte offset 415 specifies an offset of a byte within that page. In practice, for a 32-bit effective address, an ESID 405 of 4 bits, a PNO 410 of 16 bits, and a byte offset 415 of 12 bits have shown to be effective. For a 64-bit effective address, an ESID 405 of 36 bits, a page number of 16 bits, and a byte offset of 12 bits has shown to be effective.

Figure 5:
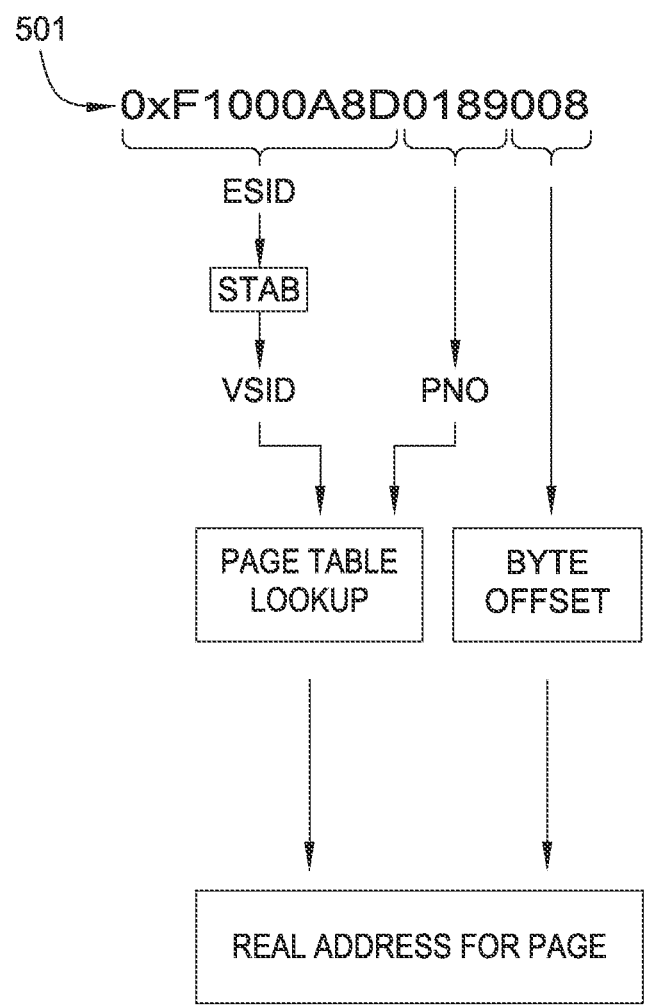
FIG. 5 illustrates an example flow of translating an effective address to a real address, according to one embodiment.

FIG. 5 illustrates an example flow of translating an effective address to a real address, according to one embodiment. Generally, the translation occurs between three different address spaces, namely the local virtual address space (effective addresses), global virtual address space (virtual addresses), and the real (or logical) address space (real/logical addresses). Generally, the processor 105, coherent accelerator kernel device driver 410, and the operating system kernel 315, and the coherent accelerator 132 are each configured to translate effective addresses to real addresses. In a first step of the process, the effective address is translated to a virtual address. The effective address may be generated by a process, and is specific to that process (via the private segment table for the process). In at least one embodiment, the kernel has its own effective address space (i.e., a private segment table). The virtual address is part of the virtual address space, which is global to all processes (and the kernel) in the system. In the second step of the process, the virtual address is translated to a real address in memory.

For example, the kernel device driver 310 may receive a request, e.g., from a process configured to issue bus commands, to perform I/O on a given storage device attached to the kernel device driver 310. The request may specify an effective address, as depicted by the effective address 501 of 0xF1000A8D0189008. Illustratively, the portion 'F1000A8D' represents the ESID of the effective address 501. The portion '0189' represents the PNO of the effective address 501. And the '008' portion represents the page offset of the effective address 501.

In one embodiment, the kernel device driver 310 translates the ESID of the effective address to a corresponding VSID. To do so, the kernel device driver 310 determines a mapping of the effective address of the process to an effective address in the shared kernel context. Doing so allows the kernel device driver 310 to determine the corresponding VSID from the global segment table using the effective address of the shared kernel context. As stated, the global segment table of the kernel may include mappings between ESIDs and VSIDs. The coherent accelerator 132 determines a corresponding VSID based on the mappings in the global segment table. Once the VSID is identified, the kernel device driver 310 then performs a lookup in the page table 111 using the VSID and PNO combination. The kernel device driver 310 then applies the byte offset in the page resulting from the lookup. As a result, the kernel device driver 310 can obtain a real address.

In one embodiment, in addition to remapping the effective address to a global virtual address, the kernel device driver 310 may build a proper command based on the I/O request and queue the command to a command and response queue. Similar to a conventional I/O stack, the application may block other I/O until the queued command completes. The kernel device driver 310 may determine whether to release the I/O before recovering the coherent accelerator and then restarting the I/O.

Figure 6:
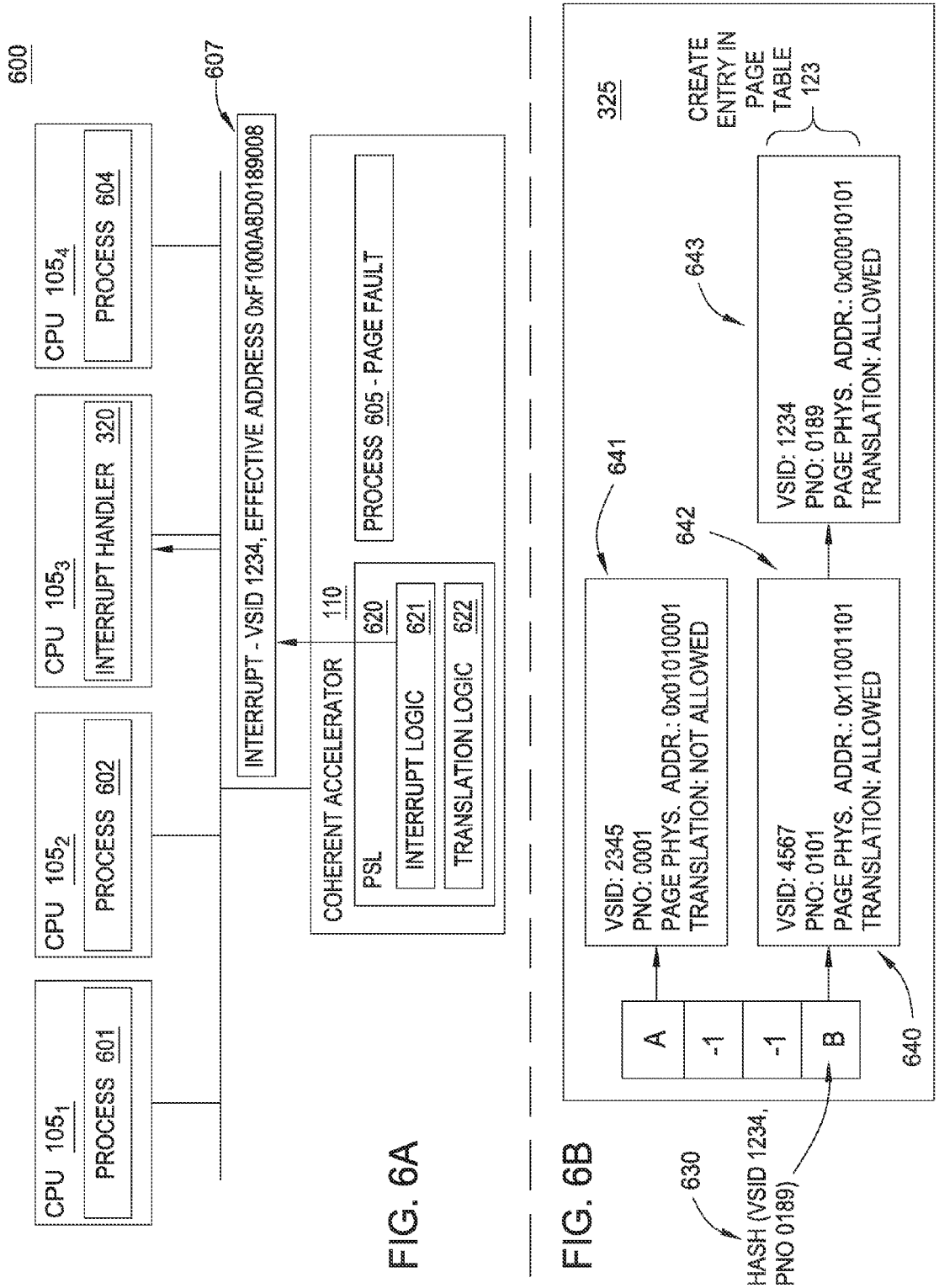
FIGS. 6A-6B are schematics illustrating techniques to provide efficient translation reloads for page faults, according to various embodiments.

FIG. 6A is a schematic illustrating techniques to provide efficient translation reloads for page faults in the system 100, according to various embodiments. As shown, the system 100 includes four example CPUs, namely CPUs $105_{1-4}$. Each CPU $105_{1-4}$ is depicted as executing a process. Specifically, CPUs $105_{1,2,4}$ execute processes 601, 602, and 604, respectively, while CPU $105_3$ executes the interrupt handler 320. FIG. 6A also depicts the coherent accelerator 132 of the system 100. As shown, the coherent accelerator 132 executes operations for a process 605 and includes a processor service layer (PSL) 620. In one embodiment, the PSL 620 is a memory management unit (MMU). Therefore, the PSL 620 translates memory addresses from virtual to real addresses, and generates page faults. The PSL 620 includes the interrupt logic 621 and address translation logic 622. The interrupt logic 621 is configured to generate an interrupt responsive to errors such as page faults. The address translation logic 622 is configured to translate effective addresses to real memory addresses in a 2-step process, as described above. In a first step, also referred to as segment level translation, the address translation logic 622 translates an effective address to a virtual segment identifier (VSID) using a STAB of the process generating the effective address. In a second step, known as a page level translation, the address translation logic 622 translates the VSID and the virtual page number (PNO) to a real address using the global page table 111.

As shown, one or more instructions (or commands) issued by the process 605 on the coherent accelerator 132 has resulted in a page fault 607. Because the coherent accelerator 132 is not running an operating system, the coherent accelerator 132 cannot resolve most page faults. Any number and type of page faults may occur on the coherent accelerator 132. For example, and without limitation, a page table entry (PTE) missing fault may occur, where a page exists in memory, but no entry exists in the page table 111 for the requested memory location. As another example, the page may not exist in memory. As still another example, a protection fault may occur (such as attempting to write to read-only memory). Further still, the page fault may be associated with the private segment table of a process.

In at least one embodiment, the page fault incurred by the process 605 is a PTE missing fault, where the page exists in memory, but no PTE exists in the page table 111. Due to the nature of this fault, creating the PTE in the page table 111 may resolve the page fault. Advantageously, embodiments disclosed herein may resolve the PTE missing page fault without having to switch to the context of the process 605 and execute the process 605 on a CPU 105.

When the page fault occurs, the interrupt logic 621 of the coherent accelerator 132 generates and sends an interrupt 607 to interrupt handler 320 executing on the processor $105_3$. As shown in FIG. 6A, the interrupt 607 includes state variables related to the page fault, namely a VSID and an effective address of the instruction that triggered the page fault. Although not pictured, more generally, the state information of the page fault may include the faulting virtual address, the reason for the fault, the faulting instruction (e.g., the instruction in a program counter), and the segment information (e.g., the VSID from the segment table of the faulting process).

Responsive to receiving the page fault interrupt 607, the interrupt handler 320 may reference the SWPFT 325 to determine whether the page fault can be efficiently resolved. FIG. 6B depicts a detailed view of the SWPFT 325. As shown, the SWPFT includes an anchor list 640. Each element of the anchor list 640 is associated with the output of a hash function 630. The hash function 630 operates on a VSID and PNO pair, and the output of the hash function hashes to one of the elements of the anchor list 640. The anchor list 640 may also be associated with elements of a linked list. For example, linked list element 641 is associated with element A of anchor list 640, and linked list elements 642, 643 are associated with element B of anchor list 640. Generally, the anchor list 640 and the linked lists associated with each element thereof may be of any size. As shown, two elements of the anchor list 640 have values of "−1", indicating no page table translations exist in the SWPFT 325 for any VSID/PNO pairs that hash to that entry of the anchor list 640. Therefore, as shown, these elements are not associated with linked lists. As previously indicated, the SWPFT 325 is exhaustive, and includes a linked list element for each page translation entry in the system (even if not included in the non-exhaustive hardware page table 111).

As shown, the linked lists elements 641-643 specify a VSID, PNO, page physical address, and a translation state for each page translation entry associated with the respective linked list element 641-643. Therefore, if the interrupt handler 320 identifies a page physical address that matches the VSID/PNO combination specified in the interrupt (and the translation state permits translations), a page translation entry may be created in the page table 111 using the page physical address to resolve the page fault.

As previously indicated, the SWPFT 325 requires a lock for all searches or modifications. Therefore, the interrupt handler 320 may acquire a lock before attempting to resolve the page fault using the SWPFT 325. In at least one embodiment, the lock is for a specific hash function 630. The interrupt handler 320 may then provide the VSID and PNO to the hash function 630. The hash function 630 may be any hash function. As shown, the hash function 630, when applied to the VSID 1234 and PNO 0189 specified in the interrupt 607, hashes to entry B of the anchor list 640. Because the hash function 630 hashed to an entry in the anchor list 640 that is not "−1", a page translation entry may exist in the SWPFT 325 for that VSID/PNO pair. The interrupt handler 320 may then traverse the linked list associated with entry B of the anchor list 640 until a linked list element is found that matches the VSID/PNO pair (or the end of the list is reached). Therefore, as shown, linked list element 643 has a VSID of 1234, and a PNO of 0189, which matches the VSID and PNO of the interrupt 607. The linked list element 643 also specifies that translations are allowed for the associated page table 111 (e.g., the page is not in an I/O state, and allows new general use translations). Therefore, the interrupt handler 320 may request the operating system 140 to create a page table entry in the page table 111 using the example page address of 0x00010101 specified in the linked list element 643. If the page table 111 entry is successfully created, the page fault is resolved. The interrupt handler 320 may then restart the coherent accelerator 132, which may resume processing instructions for process 605.

If the page translation entry is not successfully created (or the state does not allow translations), then the page fault handler 150 of the operating system 140 must be invoked to resolve the page fault. Additionally, if the hash function 630 hashes to an entry that is "−1", the page fault handler 150 of the operating system 140 must be invoked to resolve the page fault. However, when the PTE is created in the page table 111 using the information in the SWPFT 325, the page fault is resolved much faster than using the page fault handler 150.

Pages not found in the SWPFT 325 may still be valid for use by the coherent accelerator 132. However, as stated, these page faults must be resolved using the operating system page fault handler 150 because the interrupt environment of the coherent accelerator 132 is too restrictive to handle such page faults.

One example of a page fault that occurs because a memory page is not found involves removal and deletion of the segment containing that memory page. Removing a segment (e.g., a VSID) from the address space (of the process using the coherent accelerator 132 involves removing the segment from the segment table belonging to the process, notifying the coherent accelerator 132 of the deletion, and then waiting for the coherent accelerator 132 to acknowledge that it has removed that segment from any internal cache it may be using. Once the segment has been removed from all segment translation caches, its pages will be deleted. Since the segment and page deletion is running asynchronously on one of the CPUs 105, the coherent accelerator 132 may attempt to translate a page in the same VSID that is being deleted. To resolve the page fault using the SWPFT 325 therefore depends on whether the lock for the SWPFT 325 is acquired before or after the page has been removed from the SWPFT 325, and whether or not the VSID has been deleted and reallocated to a new context. In any case, if the SWPFT 325 is used to create a new PTE in the page table 111, that PTE is guaranteed to be valid either for the coherent accelerator 132 (e.g., the process that still owns the VSID), or for the new context that reallocated the VSID and created a page for it.

Figure 7:
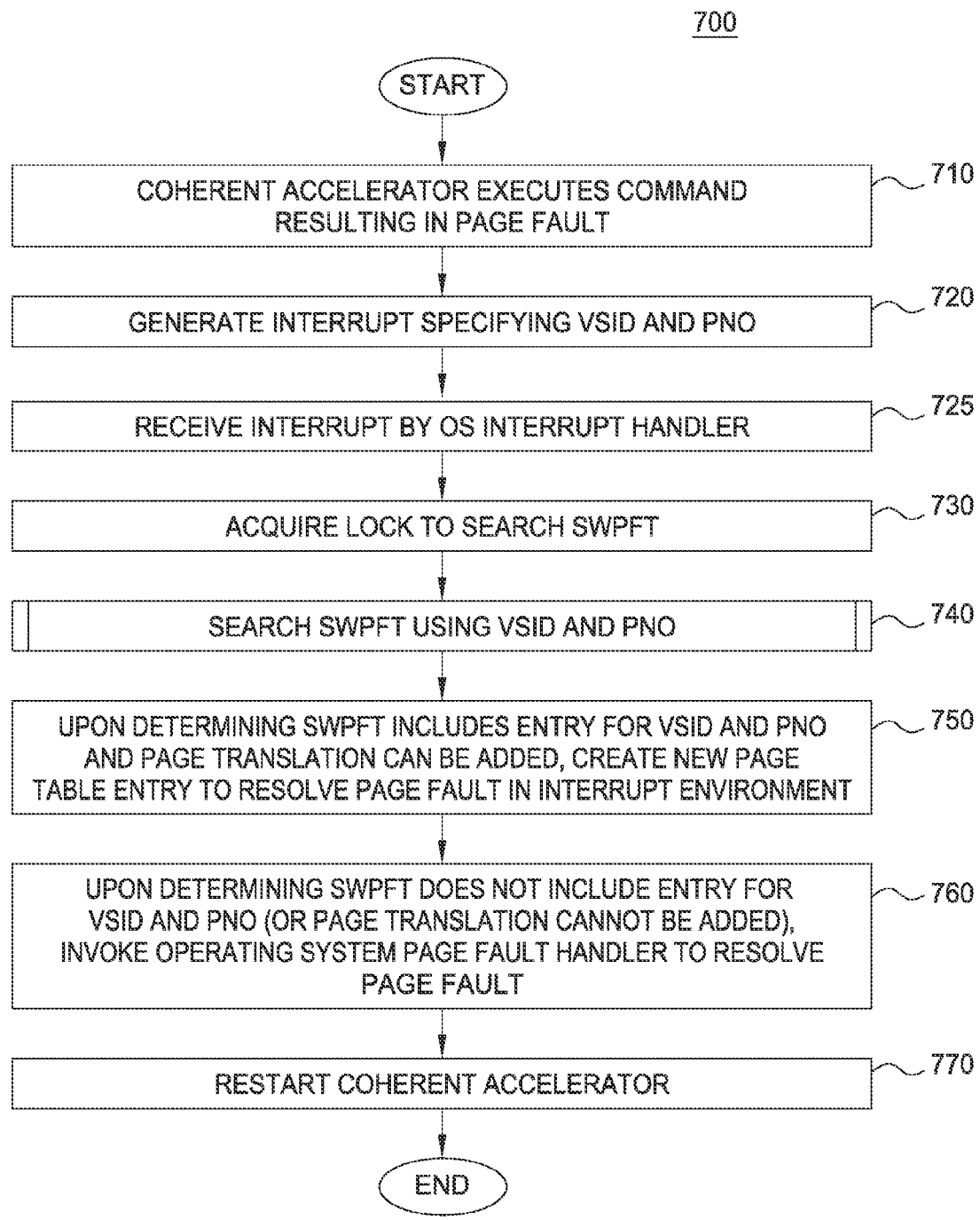
FIG. 7 is a flow chart illustrating a method to provide efficient translation reloads for page faults, according to one embodiment.

FIG. 7 is a flow chart illustrating a method 700 to provide efficient translation reloads for page faults, according to one embodiment. Generally, the steps of the method 700 allow a system configured with a coherent accelerator to resolve page faults caused by missing page translation entries in the limited interrupt handler context, obviating the need to invoke the slower page fault handler of the operating system.

As shown, the method 700 begins at step 710, where the coherent accelerator 132 executes an instruction resulting in a page fault. The page fault may be caused by the lack of a page translation entry (PTE) in the page table 111 that maps a virtual address to a physical address in memory. At step 720, the coherent accelerator 132 may generate an interrupt which specifies the VSID of the segment and PNO of the effective address which generated the page fault. As previously indicated, in one embodiment, the PNO may be determined by referencing the segment table allocated to the process which triggered the page fault with the ESID of the effective address that caused the page fault. At step 725, the operating system interrupt handler 320 may receive the interrupt. At step 730, the interrupt handler 320 may acquire a lock required to access the SWPFT 325. At step 740, described in greater detail with reference to FIG. 8, the interrupt handler 320 searches the SWPFT 325 using the VSID and PNO related to the page fault. At step 750, upon determining the SWPFT 325 includes an entry for the VSID and PNO, and that a new page translation can be created, the interrupt handler 320 invokes the operating system to create a new entry in the page table 111 to resolve the page fault. In at least one embodiment, the search of the SWPFT 325, page state validation, and creation of the entry in the page table 111 are performed while holding the lock acquired at step 730. At step 760, upon determining the SWPFT 325 does not include an entry for the VSID and PNO combination, or that the page state does not allow new translations, the operating system page fault handler 150 may be invoked to resolve the page fault.

At step 770, the coherent accelerator 132 is restarted after the page fault is resolved. In at least one embodiment, the coherent accelerator 132 resumes executing the process which resulted in the page fault, which may also include retrying the memory reference which resulted in the page fault. The coherent accelerator 132 may then determine that the translation created at steps 750 or 760 is good, and proceed accordingly. However, if the segment is no longer in the segment table (e.g., because the process removed it from its address space), the coherent accelerator 132 may generate a segment fault. In addition, any number of factors may result in a subsequent page fault (e.g., a valid translation was not created at step 760). Additionally, if the memory page is now invalid, the coherent accelerator 132 may abort its current operation and switch to a new context.

Figure 8:
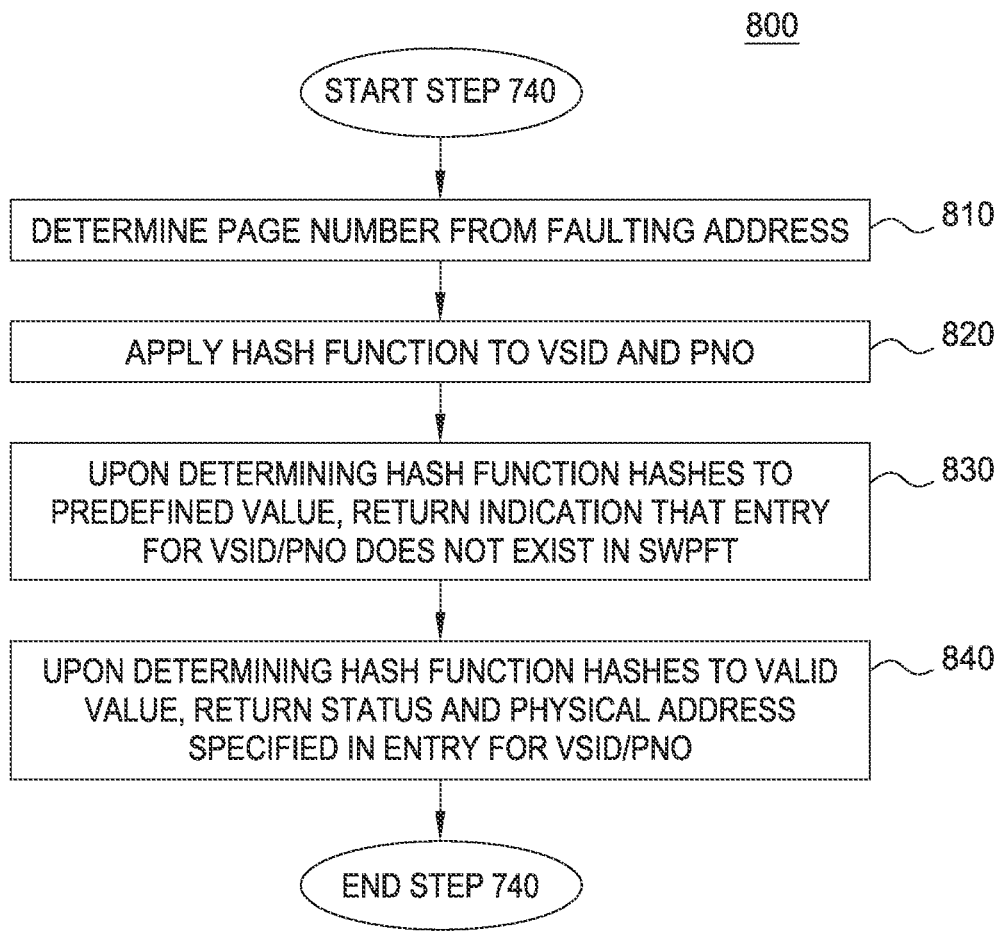
FIG. 8 is a flow chart illustrating a method to search a software page frame table, according to one embodiment.

FIG. 8 is a flow chart illustrating a method 800 corresponding to step 740 to search a software page frame table, according to one embodiment. In at least one embodiment, the interrupt handler 320 performs the steps of the method 800. As shown, the method 800 begins at step 810, where the page number is determined from the faulting effective address. Generally, the page number is a predefined field in an effective address, described in greater detail above with reference to FIGS. 4-5. At step 820, a hash function is applied to the VSID and PNO combination. At step 830, upon determining that the hash function hashes to a predefined value (such as the "−1" of FIG. 6B), an indication is returned specifying that the SWPFT 325 does not include an entry for the VSID/PNO combination. At step 840, upon determining that the hash function hashes to a valid value (such as the A or B entries of the anchor list 640 of FIG. 6B), the interrupt handler 320 may traverse the respective linked list to identify an entry matching the VSID/PNO combination, and return the status and physical address specified in the matching entry. Doing so returns the real address of the page in memory, and allows a page translation entry to be created in the interrupt environment of the coherent accelerator 132.

FIG. 9 illustrates an example set of address spaces, according to one embodiment. As shown, FIG. 9 depicts an effective address space 901 for an example application A and an effective address space 902 for an example application B. As shown, the effective address spaces 901, 902 are segmented into a plurality of segments. In one embodiment, the segments comprise 256 MB segments. The effective address spaces 901, 902 begin at effective address 0x00000000, and end at effective address 0xFFFFFFFF. As previously described, each effective address includes an ESID. As shown, therefore, application A and application B each have an example effective address of 0x2102F0E0. Each example effective address 0x2102F0E0 corresponds to a respective segment having an ESID=2 in address spaces 901, 902.

As shown, application A is associated with a segment table 903 and application B is associated with a segment table 904. The segment tables 903, 904 may also be referred to as STABs. As previously described, the segment tables 903, 904 maintain mappings between ESIDs and VSIDs. As shown, segment table 903 maps ESID 2 of application A to a VSID of 0x5678, while segment table 904 maps ESID 2 of application B to a VSID of 0x1234.

FIG. 9 also depicts a system-wide (global) virtual address space 905. As shown, the global virtual address space 905 comprises a plurality of segments, which, in one embodiment are 256 MB segments. As shown, the global virtual address space associates the VSID of 0x5678 with a virtual page number (VPN) of 0x102F, and the VSID of 0x1234 with a VPN of 0x102F.

FIG. 9 also depicts a hardware page table (HPT) 111, which maps virtual pages to their locations in real/physical memory 907. As shown, the HPT 111 may associate a VSID and VPN with a real page number (RPN). In at least one embodiment, the HPT 111 associates the result of a hash function applied to the VSID and VPN to a real page number in the physical memory address space 907. As shown, the HPT 111 associates the VSID/VPN combination of 0x5678 and 0x102F with real page number 0x3333, and the VSID/VPN combination of 0x1234 and 0x102F with real page number 0x555.

Therefore, as shown, application A and application B can each use the same effective address of 0x2102F0E0. However, these effective addresses are specific to each application's address space, and map to different locations in the physical memory address space 907. For example, for application A, the ESID of 0x2102F0E0 is 2, which is used as an index into the segment table 903, which returns a VSID of 0x5678. The VSID of 0x5678 is associated with virtual page number 0x102F in the global virtual address space 905. The VSID of 0x5678 and VPN of 0x102F is associated with real page number 0x3333 in the hardware page table 111. In at least one embodiment, a byte offset specified in the effective address is applied to the RPN 0x3333 to return an address in the physical memory address space 907.

Advantageously, embodiments disclosed herein provide techniques to quickly resolve page faults in an interrupt environment by systems configured with FPGA-based coherent accelerators. By searching a software page frame table in an interrupt environment, embodiments disclosed herein may identify the missing information needed to quickly create a page translation entry. Advantageously, doing so creates the page translation without invoking the operating system's page fault handler or switching to the context of the process which caused the page fault.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
a processor executing instructions of a first process, of a plurality of processes, wherein the first process is allocated a first segment table of a plurality of segment tables and a first effective address space of a plurality of effective address spaces;
a host bridge field-programmable gate array (FPGA)-based accelerator; and
a memory storing program code, which, when executed performs an operation comprising:
receiving, by an operating system (OS) interrupt handler, an interrupt from the host bridge FPGA-based accelerator specifying a virtual segment identifier (VSID) and a virtual page number (VPN) of a global virtual address space, wherein the host bridge FPGA-based accelerator generated the interrupt in response to a page fault incurred by accessing a hardware page table using the VSID and the VPN, wherein the host bridge FPGA-based accelerator directly determines the VSID and VPN based on a mapping in the first segment table between a first effective address of the first effective address space and the VSID and VPN, wherein the first effective address is specified in one of the instructions of the first process, wherein the first process inherits the first effective address space by attaching to a first hardware context provided by the host bridge FPGA-based accelerator, wherein the first hardware context comprises a plurality of attributes comprising: (i) one of the plurality of effective address spaces, (ii) at least one interrupt source, (iii) a memory mapped input/output (I/O) range, and (iv) one of the plurality of segment tables, wherein the host bridge FPGA-based accelerator directly accesses the first effective address space via the first hardware context and without having to set up direct memory access (DMA) with a device driver and a kernel;
identifying, in a software page frame table (SWPFT) by the OS interrupt handler, a physical address of a memory page based on the VSID and the VPN; and
creating, by the OS interrupt handler, a page table entry in the hardware page table associating the VSID and the VPN with the physical address of the memory page, wherein creating the page table entry resolves the page fault.

2. The system of claim 1, the operation further comprising, prior to identifying the physical address of the memory page:
receiving, by the OS interrupt handler, a lock required to access the SWPFT; and
identifying, by the OS interrupt handler, the VPN in a faulting effective address specified in the interrupt.

3. The system of claim 2, the operation further comprising:
prior to creating the page table entry and while holding the lock, determining by the OS interrupt handler, from the SWPFT, validating that a state of the memory page allows a translation for the memory page to be created.

4. The system of claim 2, wherein identifying the physical address of the memory page in the SWPFT comprises:
applying a first hash function to the VSID and the VPN to return a first hash value; and
traversing a linked list associated with the first hash value to identify an element of the linked list which specifies an association between: (1) the VSID and the VPN, and (2) the physical address of the memory page, wherein the linked list is traversed by the OS interrupt handler while holding the lock.

5. The system of claim 1, the operation further comprising:
upon determining that the SWPFT does not include an indication of a mapping between: (1) the VSID and the VPN and (2) the physical address of the memory page, invoking an OS page fault handler to create the page table entry.

6. The system of claim 1, wherein the SWPFT specifies an entry for each of a plurality of memory pages, wherein the hardware page table does not specify an entry for each of the plurality of memory pages, wherein the page fault is generated upon determining the hardware page table does not include an entry associating the VSID and the VPN with the physical address of the memory page.

7. A computer program product comprising:
a non-transitory computer-readable storage medium having computer-readable program code embodied therewith, the computer-readable program code executable by one or more computer processors to perform an operation comprising:
executing, by a processor, instructions of a first process, of a plurality of processes, wherein the first process is allocated a first segment table of a plurality of segment tables and a first effective address space of a plurality of effective address spaces;
receiving, by an operating system (OS) interrupt handler, an interrupt from a host bridge field-programmable gate array (FPGA)-based accelerator specifying a virtual segment identifier (VSID) and a virtual page number (VPN) of a global virtual address space, wherein the host bridge FPGA-based accelerator generated the interrupt in response to a page fault incurred by accessing a hardware page table using the VSID and the VPN, wherein the host bridge FPGA-based accelerator directly determines the VSID and VPN based on a mapping in the first segment table between a first effective address of the first effective address space and the VSID and VPN, wherein the first effective address is specified in one of the instructions of the first process, wherein the first process inherits the first effective address space by attaching to a first hardware context provided by the host bridge FPGA-based accelerator, wherein the first hardware context comprises a plurality of attributes comprising: (i) one of the plurality of effective address spaces, (ii) at least one interrupt source, (iii) a memory mapped input/output (I/O) range, and (iv) one of the plurality of segment tables, wherein the host bridge FPGA-based accelerator directly accesses the first effective address space via the first hardware context and without having to set up direct memory access (DMA) with a device driver and a kernel;

identifying, in a software page frame table (SWPFT) by the OS interrupt handler, a physical address of a memory page based on the VSID and the VPN; and creating, by the OS interrupt handler, a page table entry in the hardware page table associating the VSID and the VPN with the physical address of the memory page, wherein creating the page table entry resolves the page fault.

8. The computer program product of claim 7, the operation further comprising, prior to identifying the physical address of the memory page:

receiving, by the OS interrupt handler, a lock required to access the SWPFT; and identifying, by the OS interrupt handler, the VPN in a faulting effective address specified in the interrupt.

9. The computer program product of claim 8, the operation further comprising:

prior to creating the page table entry and while holding the lock, determining by the OS interrupt handler, from the SWPFT, validating that a state of the memory page allows a translation for the memory page to be created.

10. The computer program product of claim 7, wherein identifying the physical address of the memory page in the SWPFT comprises:

applying a first hash function to the VSID and the VPN to return a first hash value; and traversing a linked list associated with the first hash value to identify an element of the linked list which specifies an association between: (1) the VSID and the VPN, and (2) the physical address of the memory page, wherein the linked list is traversed by the OS interrupt handler while holding the lock.

11. The computer program product of claim 7, the operation further comprising:

upon determining that the SWPFT does not include an indication of a mapping between: (1) the VSID and the VPN and (2) the physical address of the memory page, invoking an OS page fault handler to create the page table entry.

12. The computer program product of claim 7, wherein the SWPFT specifies an entry for each of a plurality of memory pages, wherein the hardware page table does not specify an entry for each of the plurality of memory pages, wherein the page fault is generated upon determining the hardware page table does not include an entry associating the VSID and the VPN with the physical address of the memory page.

* * * * *